United States Patent
Shi et al.

(10) Patent No.: US 11,457,644 B2
(45) Date of Patent: Oct. 4, 2022

(54) EMULSION COMPRISING RAPESEED PROTEIN ISOLATE

(71) Applicant: DSM IP ASSETS B.V., Heerlen (NL)

(72) Inventors: Jing Shi, Echt (NL); Anthonius Cornelis Van Den Burg, Echt (NL); Gerardus Johannes Franciscus Smolders, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 10 days.

(21) Appl. No.: 16/314,903

(22) PCT Filed: Jul. 6, 2017

(86) PCT No.: PCT/EP2017/066908
§ 371 (c)(1),
(2) Date: Jan. 3, 2019

(87) PCT Pub. No.: WO2018/007508
PCT Pub. Date: Jan. 11, 2018

(65) Prior Publication Data
US 2019/0254303 A1 Aug. 22, 2019

(30) Foreign Application Priority Data

Jul. 7, 2016 (EP) ...................................... 16178339
Apr. 19, 2017 (EP) ...................................... 17166988

(51) Int. Cl.
| | | |
|---|---|---|
| *A23D 7/005* | (2006.01) | |
| *A23K 20/147* | (2016.01) | |
| *A23K 20/158* | (2016.01) | |
| *A23L 27/60* | (2016.01) | |
| *A23J 1/08* | (2006.01) | |
| *A23J 1/14* | (2006.01) | |
| *A23K 50/40* | (2016.01) | |
| *A23L 29/10* | (2016.01) | |
| *A23J 3/14* | (2006.01) | |
| *A23L 35/00* | (2016.01) | |
| *A23D 7/00* | (2006.01) | |
| *A23J 1/09* | (2006.01) | |

(52) U.S. Cl.
CPC .......... *A23D 7/0056* (2013.01); *A23D 7/003* (2013.01); *A23D 7/0053* (2013.01); *A23J 1/08* (2013.01); *A23J 1/14* (2013.01); *A23J 3/14* (2013.01); *A23K 20/147* (2016.05); *A23K 20/158* (2016.05); *A23K 50/40* (2016.05); *A23L 27/60* (2016.08); *A23L 29/10* (2016.08); *A23L 35/10* (2016.08); *A23J 1/09* (2013.01); *A23V 2002/00* (2013.01); *A23V 2200/222* (2013.01); *A23V 2200/226* (2013.01); *A23V 2250/548* (2013.01); *A23V 2250/5428* (2013.01); *A23V 2300/34* (2013.01)

(58) Field of Classification Search
CPC .... A23D 7/0053; A23D 7/0056; A23D 7/003; A23L 27/60; A23L 35/10; A23V 2002/00; A23V 2250/548; A23V 2200/222
See application file for complete search history.

(56) References Cited

U.S. PATENT DOCUMENTS

| | | | |
|---|---|---|---|
| 2,861,061 A | 11/1958 | Borel | |
| 2,861,062 A | 11/1958 | Borel | |
| 5,844,086 A | 12/1998 | Murray | |
| 6,005,076 A * | 12/1999 | Murray | A23J 1/14 530/377 |
| 8,623,445 B2 | 1/2014 | Tang | |
| 9,115,202 B2 | 8/2015 | Segall et al. | |
| 2003/0124241 A1 | 7/2003 | Westdal | |
| 2004/0039174 A1 | 2/2004 | Barker et al. | |
| 2005/0064086 A1* | 3/2005 | Hiron | A23G 3/346 426/656 |
| 2007/0014914 A1 | 1/2007 | Borders | |
| 2007/0098876 A1 | 5/2007 | Hiron | |
| 2010/0041871 A1 | 2/2010 | Segall et al. | |
| 2010/0068370 A1* | 3/2010 | Segall | A23D 7/0056 426/602 |
| 2010/0086662 A1 | 4/2010 | Cox | |
| 2010/0136173 A1* | 6/2010 | Tang | C07K 14/415 426/63 |
| 2014/0256914 A1 | 9/2014 | Green et al. | |
| 2015/0073127 A1 | 3/2015 | Wnukowski et al. | |
| 2015/0272171 A1 | 10/2015 | Lamacchia | |

(Continued)

FOREIGN PATENT DOCUMENTS

| | | | |
|---|---|---|---|
| CA | 2954314 A1 * | 10/2015 | ................ A23J 3/14 |
| DE | 102014005466 A1 | 10/2015 | |

(Continued)

OTHER PUBLICATIONS

Morr et al., "A Collaborative Study to Develop a Standardized Food Protein Solubility Procedure". Journal of Food Science vol. 50, pp. 1715-1718. (Year: 1985).*

"Determination of Soluble Crude Protein". Available online at http://www.norfor.info/files/pdf-dokumenter/pdf_lab/Analyses/ NorFor_Soluble_Crude_Protein_2013-05-23.pdf on May 23, 2013 (Year: 2013).*

Aluko, R.E, et al., "Limited enzymatic proteolysis increases the level of incorporation of canola proteins into mayonnaise", Innovated Food Science and Emerging Technologies, Jun. 1, 2005, pp. 195-202, vol. 6, Elsevier, Amsterdam, NL.

(Continued)

*Primary Examiner* — Erik Kashnikow
*Assistant Examiner* — Assaf Zilbering
(74) *Attorney, Agent, or Firm* — McBee Moore & Vanik IP, LLC; Susan McBee; Chester Moore

(57) ABSTRACT

An emulsion comprising water, vegetable oil, and an emulsifying agent comprising at least 20 wt. % of soluble native rapeseed protein isolate comprising 40 to 65 wt. % cruciferins and 35 to 60 wt. % napins and having a solubility of at least 88% over a pH range from 3 to 10 at a temperature of 23±2° C.

12 Claims, No Drawings

(56) References Cited

U.S. PATENT DOCUMENTS

| | | | |
|---|---|---|---|
| 2016/0031950 | A1 | 2/2016 | Jaramillo Freydell et al. |
| 2017/0027190 | A1 | 2/2017 | During et al. |
| 2019/0150473 | A1 | 5/2019 | Willemsen et al. |
| 2019/0254303 | A1 | 8/2019 | Shi et al. |
| 2019/0307149 | A1 | 10/2019 | Willemsen et al. |
| 2019/0307160 | A1 | 10/2019 | Shi et al. |
| 2020/0154732 | A1 | 5/2020 | Shi et al. |
| 2021/0177005 | A1 | 6/2021 | Hylkema et al. |

FOREIGN PATENT DOCUMENTS

| | | | |
|---|---|---|---|
| EP | 1389921 | A1 | 2/2004 |
| EP | 1715752 | A1 | 11/2006 |
| EP | 1720415 | A1 | 11/2006 |
| EP | 2364602 | A1 | 9/2011 |
| EP | 2736351 | A1 | 6/2014 |
| EP | 15200789 | A | 12/2015 |
| EP | 17166993 | | 4/2016 |
| EP | 16178339 | A | 7/2016 |
| EP | 16178340 | A | 7/2016 |
| EP | 16178343 | A | 7/2016 |
| EP | 16178345 | A | 7/2016 |
| EP | 16178347 | A | 7/2016 |
| EP | 16178348 | A | 7/2016 |
| EP | 17166992 | | 4/2017 |
| EP | 3389391 | A1 | 10/2018 |
| EP | 3481218 | B1 | 5/2019 |
| WO | 02/089598 | A1 | 11/2002 |
| WO | 03/034836 | A1 | 5/2003 |
| WO | 03/043439 | A1 | 5/2003 |
| WO | 2005/067729 | A1 | 7/2005 |
| WO | 2005/077201 | A1 | 8/2005 |
| WO | 2008/094434 | A2 | 8/2008 |
| WO | 2010/003245 | A1 | 1/2010 |
| WO | 2010003245 | A1 | 1/2010 |
| WO | 2013/000066 | A1 | 1/2013 |
| WO | 2015/114543 | A2 | 8/2015 |
| WO | 2017/102535 | A1 | 6/2017 |
| WO | 2018/007490 | A1 | 1/2018 |
| WO | 2018/007491 | A1 | 1/2018 |
| WO | 2018/007492 | A1 | 1/2018 |
| WO | 2018/007493 | A1 | 1/2018 |
| WO | 2018/007494 | A1 | 1/2018 |
| WO | 2018/007508 | A1 | 1/2018 |

OTHER PUBLICATIONS

Wanasundara, Janitha P.D. et al., "Canola/rapeseed protein-functionality and nutrition", OCL, Jul. 1, 2016, p. D407, vol. 23, No. 4.
Campbell, Lisa et al., "Canola/Rapeseed Protein: Future Opportunities and Directions—Workshop Proceedings of IRC 2015", Plants, Apr. 13, 2016, p. 17, vol. 5, No. 2.
International Search Report of International Patent Application No. PCT/EP2017/066908 dated Sep. 11, 2017.
Gerzhova, Alina et al., "Study of total dry matter and protein extraction from canola meal as affected by the pH, salt addition and use of zeta-potentlal/turbldimetry analysis to optimize the extraction conditions," Food Chemistry, Elsevier Ltd, NL, vol. 201, Jan. 22, 2016, pp. 243-252, XP029413712.
Akbari, Ali et al., "An integrated method of isolating napin an cruciferin from defatted canola meal", LWT-Food Science and Technology, Jun. 3, 2015, pp. 308-315, vol. 64, No. 1.
Karaca, Asli Can et al., "Emulsifying properties of canola and flaxseed protein isolates produced by isoelectric precipitation and salt extraction", Food Research International, Jul. 8, 2011, pp. 2991-2998, vol. 44, No. 9.
Nickerson, Michael, Development of Formulated canola Protein-based ingredients for the Food industry, Apr. 14, pp. 1-342.
International Search Report of International Patent Application No. PCT/EP2017/066872 dated Sep. 8, 2017.
International Search Report of Internafionai Patent Application No. PCT/EP2017/066871 dated Sep. 7, 2017.
"The French have set off a trend of "detoxification" when they eat, and they can't even have gluten," European Times, published Nov. 13, 2015, 7 pages.
Wang, Xiao-hua, "Discussion on the oil making technology of imported rapeseed", Cereals & Oils, Issue 1, pp. 23-24, published on Dec. 31, 1999.
Rebuttal to Kevin Segall declaration submitted in EP opposition, dated Jun. 2, 2021, 1 page.
Decision rejecting opposition in oral proceedings of EP application No. 17735153.3, dated Mar. 9, 2022, 1 page.
Opposition to European Patent Application No. 3481216, mailed Mar. 3, 2021.
Notice of Opposition to European Patent Application No. 3481216, mailed Mar. 3, 2021.
Letter accompanying subsequently filed items with the Opposition to European Patent Application No. 3481216, mailed Mar. 3, 2021.
Consolidated List of Citations filed items with the Opposition to European Patent Application No. 3481216.
Oral Presentation Themes 119-146 Abstracts, 14th International Rapeseed Congress, Jul. 2015, Canada.
Annual Information Form for the year ended Mar. 31, 2012, Burcon Nutrascience Corporation, Jun. 25, 2012, pp. 1-74.
Anna-Stina Hoglund et al., "Distribution of Napin and Cruciferin in Developing Rape Seed Embryos 1", Plant Physiol., 1992, pp. 509-515, vol. 98, Department of Cell Research, Uppsala Biomedical Center, Swedish University of Agricultural Sciences, Uppsala, Sweden.
Screw Oil Press—gemco-machine.com/Screw-Oil-Press.html.
Kevin Segall, Report about experimentation conducted regarding the rapeseed protein isolates described on EP 3481216 (the opposed patent (OP)) and WO 2013/000066, pp. 1-8.
Acknowledgment of receipt, Submission No. 9560700, Application No. EP17734756.4, European Patent Application No. EP3481216, Mar. 3, 2021.
Acknowledgment of receipt, Submission No. 9561629, Application No. EP17734756.4, European Patent Application No. EP3481216, Mar. 3, 2021.
Communication of a Notice of Opposition in European Patent Application No. 3481216, mailed Mar. 4, 2021.
Communication of a Notice of Opposition in European Patent Application No. 3481216, mailed Mar. 10, 2021.
"Guide to Calf Milk Replacers: Types, Use and Quality," Bovine Alliance on Management & Nutrition (BAMN Publication), 2008.
14th International Rapeseed Congress—Abstracts, 2015, pp. 120-147.
Communication of a Notice of Opposition in EP App. No. 17734757.2 dated Feb. 4, 2021.
Declaration of Kevin Segall dated Dec. 23, 2020.
Declaration of Kevin Segall dated Jan. 27, 2021.
Fukushima et al., "Denaturation of Soybean Proteins by Organic Solvents," Soybean Protein Denaturation, Mar. 1969, vol. 46, 156-163. (Year: 1969).
Krishnamoorthy, Upoorand John Moran, "Rearing Young Ruminants on Milk Replacers and Starter Feeds," FAO Animal Production and Health Manual, 2011.
Nickerson, Michael, "Protein Functionality Testing Manual," 2012, University of Saskatchewan.
Rezig et al., "Pumpkin (*Cucurbita maxima*) Seed Proteins: Sequential Extraction Processing and Fraction Characterization," Journal of Agricultural and Food Chemistry, 2013, 61(32), 7715-7721 (Year: 2013).
International Search Report of International Patent Application No. PCT/EP2016/080234 dated Feb. 10, 2017.
PCT International Search Report for PCT/EP2017/066869, dated Aug. 8, 2017.
Pudel et al., "Production and properties of rapeseed albumin," Lipid Technology, (2015), vol. 27, No. 5: 112-114.
J. Kroll, "Selected functional properties of detoxified eapeseed protein preparations effected by phytic acid," Die Nahrung—Food, (1991) vol. 35, No. 6: 619-624.

(56) References Cited

OTHER PUBLICATIONS

Kodagoda, et al., "Some Functional Properties of Rapeseed Protein Isolates and Concentrates," Can. Inst. Food Sci. Technol. J., (1973), vol. 6, No. 4: 266-269.
Kroll et al., "Beeinflussung funktioneller Eigenschaften von Proteinen durch gekoppelte mechanolytische und chemische Modifizierung," Die Nahrung—FOOD, (1984), vol. 28, No. 4: 389-396.
Decision rejecting opposition (Art. 101(2) EPC) of EP application No. 17735153.3, dated May 2, 2022, 36 pages.

* cited by examiner

EMULSION COMPRISING RAPESEED PROTEIN ISOLATE

CROSS-REFERENCE TO RELATED APPLICATIONS

This application is a National Stage entry of International Application No. PCT/EP2017/066908, filed 06 Jul. 2017, which claims priority to European Patent Application Nos. 16178339.4, filed 07 Jul. 2016, and 17166988.0, filed 19 Apr. 2017.

BACKGROUND

Field of the Invention

The present invention is directed to an emulsion comprising rapeseed protein isolate, vegetable oil and water and a process for preparing the emulsion. Also disclosed is the use of the emulsion in food products.

Description of Related Art

Dressings and mayonnaise-type spreads are popular condiments for foods, such as, for example, sandwiches, salads, and the like. Mayonnaise is an edible emulsion of vegetable oil and water along with other ingredients, including egg yolk protein. The United States Food and Drug Administration ("FDA") states that mayonnaise-type spreads may contain vegetable oil, acidulant (additives to increase acidity), egg yolk-containing ingredients, and optionally, other ingredients, such as spices, preservatives, and/or crystallization inhibitors (21 C.F.R. §169.140(a)). The FDA describes salad dressing as the emulsified semisolid food prepared from vegetable oil(s), an acidulant, an egg yolk-containing ingredient and a starchy paste (21 C.F.R. §169.150(a)).

The egg yolk protein may serve as an emulsifying agent to stabilize the oil/water emulsion as well as imparting flavor and texture to the dressing or spread. However, the use of egg yolk is often undesirable. For example, due to problems with egg allergies, medical problems associated with cholesterol levels in eggs, religious restrictions/convictions, culinary preferences (such as, for example, a vegetarian or a vegan diet), cost fluctuations in the price of eggs, use of antibiotics and hormones in poultry production, and diseases associated with poultry (such as, for example, bird flu), the use of alternative emulsifying agents may be desired.

The use of vegetable based proteins in such emulsions is known. For example, WO 2008/094434 discloses the use of wheat protein isolates as an alternative to the use of egg yolk protein in compositions. The use of soy based protein has also been described for example in WO 2014/018922. However, the use of wheat protein isolates may not be desirable for those with gluten allergies and there may also be intolerances to soy based proteins.

Furthermore, it has been found that if during packaging process, the emulsions or spreads made with these vegetable proteins are heat treated, that the emulsion may de-stabilize and separate out into its constituents.

There is therefore a need to find to find a suitable vegetable based protein isolate that can be used as an emulsifier to replace egg yolk and yet maintain the required texture, flavor, and heat stability.

Soy protein is widely used, however in view of some intolerances to soy products there is a need to find other sources of vegetable proteins. Suitable alternatives include pea protein and rapeseed protein. Rapeseed seeds are rich in oil and contain considerable amounts of protein that account for 17 to 25% of seed dry weight. Processing rapeseed for oil for human consumption produces rapeseed meal (also referred to as cake; 60%), which contains about 30 to 40% protein, as a by-product. The rapeseed used for this purpose is usually of the varieties *Brassica napus* and *Brassica juncea*. These varieties contain only low levels of erucic acid and glucosinolate, and are also known as Canola. Canola is a contraction of Canada and ola, for "oil low acid", but is now a generic term defined as rapeseed oil comprising <2% erucic acid and <30 mmol/g glucosinolate. The resultant rapeseed meal is currently used as a high-protein animal feed.

Proteins are available as hydrolysates, native protein, concentrates and isolates. Hydrolysates are proteins that have been partially broken down by exposing the protein to heat, acid or enzymes that break apart the bonds linking amino acids. This makes it taste more bitter, but also allows it to be absorbed more rapidly during digestion than a native (non-hydrolyzed) protein. Isolates are purer than concentrates, meaning other non-protein components have been partially removed to "isolate" the protein. Many concentrates are around 80% protein, which means that on a dry basis, 80% of the total weight is protein. Isolates are typically around 90% protein (dry basis). This is calculated using the Kjeldahl method.

The predominant storage proteins found in rapeseed are cruciferins and napins. Cruciferins are globulins and are the major storage protein in the seed. It is composed of 6 subunits and has a total molecular weight of approximately 300 kDa. Napins are albumins and are a low molecular weight storage protein with a molecular weight of approximately 14 kDa. Napins are more easily solubilized and in for example EP 171575281 a process is disclosed to separate out the more soluble napin fraction, preferably to at least 85 wt. %. Napins are primarily proposed for use used in applications where solubility is key. DE 10 2014 005466 A1 also describes a process for obtaining purified cruciferin and napin fractions. During the process, also a protein mixture of the two with 55-60% napins and 40-45% cruciferins is obtained. The solubility of this protein mixture is approximately 75%.

Rapeseed proteins can also be divided into various fractions according to the corresponding sedimentation coefficient in Svedberg units (S). This coefficient indicates the speed of sedimentation of a macromolecule in a centrifugal field. For rapeseed proteins, the main reported fractions are 12S, 7S and 2S. Cruciferin and napin are the two major families of storage proteins found in canola/rapeseed. Napin is a 2S albumin, and cruciferin is a 12S globulin. Furthermore, Schwenke and Linow (Nahrung (1982) 26, K5-K6) state that reversible dissociation of the 12S globulin from rapeseed (*Brassica napus* L.) depends on ionic strength. The cruciferin complex is present as a 300 kDa 12S hexamer when exposed to higher ionic strength ($\mu \geq 0.5$ mS/cm), and reversibly dissociates into 7S trimeric molecules of 150 kDa when exposed to low ionic strength conditions.

The incorporation of rapeseed proteins in the form of protein hydrolysates into mayonnaise to replace up to 50% of the egg yolk protein is described by Aluko et al. (Bioproducts and Processing Section, Agriculture and Agri-Food Canada, 107 Science Place, Saskatoon, SK, Canada S7N 0X2), however no advantages are shown. Von Der Haar et al. (OCL (2014) 21(1) D104, published by EDP Sciences) discloses that the protein extraction method and the protein isolate content is also important for the final properties of for example mayonnaise where up to 15% of the egg yolk is replaced with rapeseed protein. Also in US 2010/0068370 the replacement of egg yolk, in whole or in part, by rapeseed protein isolate in mayonnaise is reported. However, the drawback of this method is that rapeseed protein isolate needs to be fractionated such that a protein micellar mass is obtained together with a fraction isolated from the supernatant. The first protein micellar mass has a high content of 7S protein (these are not the 12S cruciferins but a dissociated form), whereas the second fraction is high in 2S protein, being the relatively soluble napins.

Therefore, there is a need to (partially) replace egg yolk with rapeseed protein isolate 'as is', i.e. without the rapeseed protein having to undergo fractionating steps to yield only soluble napins and/or whereby cruciferins are either removed or dissociated into their 7S substituents.

SUMMARY

It has been found that the use of soluble native rapeseed protein isolate comprising both cruciferins and napins, obtained from cold pressed oilseed meal and extracted under mild conditions gave surprisingly good results when used to replace egg yolk in emulsions fully or partially.

In a first aspect of the invention there is provided an emulsion comprising:
 i) 15 to 75 wt. % of water;
 ii) 5 to 80 wt. % of vegetable oil;
 iii) 1.5 to 5 wt. % of an emulsifying agent comprising at least 20 wt. % of native rapeseed protein isolate comprising 40 to 65 wt. % cruciferins and 35 to 60 wt. % napins and having a solubility of at least 88% over a pH range from 3 to 10 at a temperature of 23±2° C.;
 iv) up to 15 wt. % of additives;
 wherein i)+ii)+iii)+iv) add up to 100 wt. % or less.

DETAILED DESCRIPTION OF A PREFERRED EMBODIMENT

The rapeseed protein isolate is produced from cold pressed rapeseed press meal, the by-product of rapeseed oil production. This rapeseed protein isolate production process starts with an extraction step, in which rapeseed meal is combined with an aqueous salt solution, for example 0 to 5% sodium chloride, at a temperature between 4 to 75° C., more preferably 20 to 75° C. and most preferably 40 to 75° C. Preferably the meal to water ratio is in the range of from 1:5 to 1:40, more preferably 1:5 to 1:20. After a period in the range of from 5 min to 2 hours the protein rich solution is separated from the insoluble material. The protein rich solution is hereafter referred to as the extract. The pH of the extract is adjusted and the extract is further processed to clarify the material and remove non-protein substances. The residual fat and formed precipitates are removed via a solid/liquid separation step (e.g. filtration or centrifugation). The extract is then concentrated and washed in an ultrafiltration/diafiltration (UF/DF) step. The UF/DF step has the purpose of concentrating the protein and removing antinutritional factors (e.g. polyphenols, residual phytate, glucosinolates). Finally, the washed concentrate may be dried in a suitable dryer, such as a spray drier (single or multistage) with an inlet temperature in the range of from 150 to 200° C. and an outlet temperature in the range of from 50 to 100° C. resulting in the rapeseed protein isolate. Preferably the rapeseed protein isolate is obtained in a process without a fractionating step for separating out cruciferins and napins. Preferably the rapeseed protein isolate is obtained in a process where the levels of napin and cruciferin are kept substantially constant (i.e. neither the napin or cruciferin levels are deliberately increased).

The water (i) should be water suitable for human consumption. Preferably the emulsion comprises 15 to 50 wt. % of water and more preferably 15 to 30 wt. % of water.

The vegetable oil (ii) may be any vegetable oil known in the use of edible emulsion and spreads. Vegetable oils include but are not limited to: corn oil, soybean oil, rapeseed oil, vegetable oil, safflower oil, sunflower oil, nasturtium seed oil, mustard seed oil, olive oil, sesame oil, peanut oil, cottonseed oil, rice bran oil, babassu nut oil, castor oil, palm oil, palm kernel oil, low erucic acid rapeseed oil, lupin oil, jatropha oil, coconut oil, flaxseed oil, evening primrose oil, jojoba oil, cocoa butter, fractions of any thereof, and mixtures of any thereof. Preferably the emulsion comprises 25 to 80 wt. % of vegetable oil and more preferably 50 to 80 wt. % of vegetable oil. Preferably the vegetable oil comprises at least 80 wt. % of rapeseed oil.

The emulsifying agent (iii) may comprise, in addition to the native rapeseed protein isolate comprising 40 to 65 wt. % cruciferins and 35 to 60 wt. % napins having a solubility of at least 88% over a pH range from 3 to 10 at a temperature of 23±2° C., a protein selected from the group consisting of whey protein, soy protein, whole soybean protein, milk protein, safflower protein, rapeseed protein, egg protein, isolates of any thereof, concentrates of any thereof, and combinations of any thereof. Preferably the emulsion comprises 2 to 5 wt. % of an emulsifying agent and more preferably 2 to 4 wt. % of an emulsifying agent. Preferably the emulsifying agent comprises at least 30 wt. %, more preferably 40 wt. %. most preferably at least 60%, especially at least 85% and most especially at least 95% of the rapeseed protein isolate.

In addition, it was surprisingly found that a combination of approximately equal amounts of egg yolk protein and rapeseed protein as emulsifying agent in iii) resulted in higher viscosity emulsions than the use of either alone, indicating a synergistic effect. Therefore, in a preferred embodiment there is provided an emulsion according to the invention wherein in iii) the emulsifying agent comprises rapeseed protein isolate and egg yolk protein in a ratio in the range of from 25:75 to 75:25, preferably of from 40:60 to 60:40, more preferably of from 45:55 to 55:45. The resultant emulsion has a viscosity higher by 15% than the average of the viscosity of an equivalent emulsion using only rapeseed protein isolate or only egg protein. An advantage of using this combination in an emulsion of the invention is that it gives a substantially increased viscosity, which means that it is possible to reduce the amount of oil needed and increase the amount of water to achieve the viscosities expected in the resultant food products. These could then be produced as low fat alternatives. As used herein, the term "emulsifier" includes a substance which stabilizes an emulsion.

The additives (iv) preferably comprise acidulant. The acidulant may be, for example, vinegar, lemon juice, lime juice, citric acid, ascorbic acid, malic acid, fumaric acid, lactic acid, adipic acid, acetic acid, benzoic acid, tartaric acid, and combinations of any thereof. The acidulant may be effective as a preservative as well as to give flavor to the composition. The vinegar may be any known in the art such as, for example white vinegar, wine vinegar, apple cider vinegar, malt vinegar, balsamic vinegar, fruit vinegar, herbal vinegar, or combinations of any thereof. Vinegars are commercially available as approximately 5% by weight aqueous solutions of acetic acid. Preferably the emulsion comprises 1 to 10 wt. % of additive (iv) and more preferably 1 to 5 wt. % of additive (iv). The emulsion of the present disclosure may further comprise other ingredients, such as, for example, food starches, sweeteners, spices, seasonings (including salt), food pieces, stabilizers, antioxidants, sterols, soluble fiber, gums, flavorings, preservatives, colorants, and various combinations of any thereof.

Preferably the native rapeseed protein isolate has a solubility of at least 88%, preferably of at least 94% and more preferably at least 96% when measured over a pH range from 3 to 10 at a temperature of 23±2° C. This is also known as the soluble solids index (SSI).

For use in human food consumption the native rapeseed protein isolate preferably comprises a low level of salt. This can be established by measuring the conductivity. Preferably the conductivity of the native rapeseed protein isolate in a 2 wt. % aqueous solution is less than 9,000 µS/cm over a pH range of 2 to 12. More preferably the conductivity of the native rapeseed protein isolate in a 2 wt. % aqueous solution is less than 4,000 µS/cm over a pH range of 2.5 to 11.5. For comparison, the conductivity of a 5 g/L aqueous sodium chloride solution is around 9,400 µS/cm.

Preferably the native rapeseed protein isolate has a phytate level less than 0.4 wt. %, more preferably less than 0.25 wt. % and most preferably less than 0.15 wt. %.

Preferably the native rapeseed protein isolate has a protein content of at least 90 wt. % (calculated as Kjeldahl N×6.25) on a dry weight basis, more preferably at least 94 wt. %, most preferably at least 96 wt. % and especially at least 98 wt. %.

Preferably the native rapeseed protein isolate is substantially unhydrolyzed. By substantially unhydrolyzed is meant that the protein is not deliberately hydrolyzed.

Preferably the resultant emulsion has an oil droplet size in the range of from 2 to 10 µm, more preferably of from 3 to 6 µm.

Preferably the resultant emulsion has a viscosity greater than 50,000 cP at 4° C., more preferably from 50,000 cP to 100,000 cP, still more preferably from 60,000 cP to 90,000 cP, most preferably from 70,000 cP to 80,000 cP.

Furthermore, the resultant emulsion is preferably heat stable at 110° C. for at least 10 minutes.

In a second aspect, the invention provides a process for obtaining an emulsion comprising:
i) 15 to 75 wt. % of water;
ii) 5 to 80 wt. % of vegetable oil;
iii) 1.5 to 5 wt. % of an emulsifying agent comprising at least 20 wt. % of native rapeseed protein isolate comprising 40 to 65 wt. % cruciferins and 35 to 60 wt. % napins and having a solubility of at least 88% over a pH range from 3 to 10 at a temperature of 23±2° C.;
iv) up to 15 wt. % of additives;
wherein i)+ii)+iii)+iv) add up to 100 wt. % or less.
comprising the steps of:
A) mixing ingredients (i) and (iii) to solubilize (iii);
B) adding (ii) while stirring;
C) adding (iv) while stirring.

The emulsion may be prepared using processes well known in the art. In an embodiment of the present invention there is provided a process for forming an emulsion of the invention comprising mixing the emulsifying agent with water, to form a slurry and blending the vegetable oil into the slurry to form an emulsion. The additives or other ingredients may be added at any time. Preferably the additive, if an acidulant, is added after blending in of the vegetable oil. According to a further embodiment, the process may comprise mixing at least one additional ingredient with the rapeseed protein isolate.

In a third aspect, the invention provides the use of an emulsion according to the first aspect of the invention in food products or pet food products.

In a preferred embodiment, the invention provides the use of an emulsion in food products selected from the group consisting of mayonnaise, dressings, and mayonnaise-type spreads.

In another preferred embodiment, the invention provides the use of an emulsion in pet food products that comprise from 5% to 35% of native rapeseed protein isolate by weight of the pet food product, preferably from 25% to 30%. Native rapeseed protein isolate can be used as a gluten-replacing ingredient in pet food, which is advantageous as some pets can be sensitive to gluten. The term "pet food" means any composition intended to be consumed by a pet. Meat or fish pet food can be a meat or fish emulsion product having a realistic meat- or fish-like image. The rapeseed protein isolate can be added to the meat or fish material before and/or after the meat or fish material is emulsified as described in e.g. WO 2015/114543. The pet can be any suitable animal, such as avian, bovine, canine, equine, feline, hircine, lupine, murine, ovine, or porcine animal.

Non-limiting Examples and comparative examples of the invention are described below.

EXAMPLES

Test Methods

Protein Content
Protein content of the native rapeseed protein isolate was determined by the Kjeldahl method according to AOAC Official Method 991.20 Nitrogen (Total) in Milk, using a conversion factor of 6.25 to determine the amount of protein (% (w/w)).
Conductivity
The conductivity of native rapeseed protein isolate in a 2 wt. % aqueous solution was measured using a conductivity meter: Hach sensION+ EC71.
Phytate Level
Phytate level was measured at Eurofins using method QD495, based on Ellis et al, Analytical Biochemistry Vol. 77:536-539 (1977).
Viscosity Analysis
A Brookfield DVE viscometer in helipath stand equipped with T-bar spindles no C (if the expected viscosity is in the range from 20,000 to 50,000 cP) or D (if the expected viscosity is >50,000 cP) was used. The emulsion (125 g) was placed into the sample jar (50 cm$^3$) and stored for at least 24h at around 4° C. Before testing the temperature of the emulsion was measured. The rotating speed was set to 12 rpm. The spindle was lowered in the emulsion using the heelpath stand and the reading was observed and the viscosity value just before reaching the end of the heelpath trace was recorded.
Heat Stability Test
A grease-proof baking paper was placed on a baking tray. A metal molding ring (diameter 3.5 cm, height 1.0 cm) was placed on the paper and the ring was filled with emulsion while avoiding entrapping air. The emulsion was smoothed level with a spatula. The molding ring was removed slowly so that a cylinder of emulsion remained standing on the paper. The baking tray was placed in a pre-heated oven at 110° C. and incubated for 10 minutes. After removal of the baking tray from the oven the emulsion cylinders were visually observed, looking for oil separation on the grease-proof paper. Ideally no/little oil separated out from the emulsion cylinder.

Oil Droplet Measurement

The emulsion droplet size was measured by Laser Diffraction Particle Size Analyzer LS 13320 (Beckman Coulter B.V. Woerden, the Netherlands).

Solubility Test:

The below solubility test is adapted from Morr et al. (J. Food Sci. (1985) 50, 1715-1718), the difference being the use of water instead of 0.1 M sodium chloride.

Sufficient protein powder to supply 0.8 g of protein was weighed into a beaker. A small amount of demineralized water was added to the powder and the mixture was stirred until a smooth paste was formed. Additional demineralized water was then added to make a total weight of 40 g (yielding a 2% w/w protein dispersion). The dispersion was slowly stirred for at least 30 min using a magnetic stirrer. Afterwards the pH was determined and adjusted to the desired level (2, 3, 4, etc.) with sodium hydroxide or hydrochloric acid. The pH of the dispersion was measured and corrected periodically during 60 minutes stirring. After 60 minutes of stirring, an aliquot of the protein dispersion was reserved for protein content determination (Kjeldahl analysis). Another portion of the sample was centrifuged at 20,000 g for 2 min. The supernatant and pellet were separated after centrifugation. The protein content was also determined by Kjeldahl analysis. Protein solubility (%)= (protein in supernatant/protein in total dispersion)×100.

Alternative methods for determining solubility are available and in some case use buffers, like borate-phosphate buffer in WO 2011/057408. However, such as values are incomparable with the ones obtained in the instant application that are determined in the absence of buffer.

Example 1

Preparation of Rapeseed Protein Isolate (RPI90)

The rapeseed protein isolate was produced from cold-pressed rapeseed oil seed meal having an oil content of less than 15% on dry matter basis, cleaned and processed below 75° C.

In the extraction step, the cold-pressed rapeseed oil seed meal was mixed with an aqueous salt solution (1 to 5% sodium chloride), at a temperature between 40 to 75° C. The meal to aqueous salt solution ratio was in the range of from 1:5 to 1:20. After about 30 minutes to 1 hour the protein rich solution (extract) was separated from the insoluble material. The pH of the extract was adjusted to neutral and the extract was further processed to clarify the material and remove non-protein substances.

In the decreaming step, the residual fat was removed via a liquid/liquid separation step using centrifugation. Non-protein substances were removed by adjusting the pH of the material to neutral in the presence of a salt with which phytate precipitates (e.g. calcium chloride). The formed precipitate is removed via a solid/liquid separation step (e.g. a membrane filter press or centrifugation) in which the impurities are removed in a solid salt form (e.g. calcium phytate). The extract was then concentrated and washed in an ultrafiltration/diafiltration (UF/DF) step. Finally, the washed concentrate was dried in a spray drier with an inlet temperature in the range of from 150 to 200° C. and an outlet temperature in the range of from 50 to 100° C. resulting in the rapeseed protein isolate. Several batches were prepared and tested.

TABLE 1

| | pH | | | | | | | |
|---|---|---|---|---|---|---|---|---|
| | 3 | 4 | 5 | 6 | 7 | 8 | 9 | 10 |
| Sample 1 Solubility (%) | 98 | 96 | 89 | 95 | 95 | 97 | 97 | 98 |
| Sample 2 Solubility (%) | 102.5 | 97.5 | 94.3 | 93.9 | 97.0 | 93.0 | 94.0 | 99.8 |

The conductivity of the resultant native rapeseed protein isolates in a 2% solution was less than 4,000 µS/cm over a pH range of 2.5 to 11.5.

The resultant native rapeseed protein isolate comprised in the range of from 40 to 65% cruciferins and 35 to 60% napins.

The resultant native rapeseed protein isolate contained less than 0.26 wt. % phytate.

The resultant native rapeseed protein isolates had a solubility of at least 88% when measured over a pH range from 3 to 10 at a temperature of 23±2° C. as shown for two batches in Table 1.

Example 2

Emulsion Preparation with Rapeseed Protein Isolate (RPI)

In this example, a typical mayonnaise is prepared. All ingredients were at ambient temperature (23±2° C.) and quantities were as shown in Table 2 below. Tap water, salt and RPI according to the invention (Example 1, RP190 available from DSM, native rapeseed protein isolate comprising 40 to 65 wt. % cruciferins and 35 to 60 wt. % napins and having a solubility of at least 88% over a pH range from 3 to 10 at a temperature of 23±2° C. and a conductivity in a 2 wt. % solution of less than 4,000 µS/cm over a pH range of 2.5 to 11.5) were added to a beaker (1 L). The salt and rapeseed protein isolate were dissolved in the water by mixing with a hand-held kitchen blender (Bosch 300 Watt, 2 knives, speed set at 1) for 5 seconds and then the left to stand to allow full hydration of the rapeseed protein isolate for about 1 minute. The protein/salt solution was then mixed with the blender while gradually vegetable oil was added via a funnel at a speed of 2 to 3 g oil/s over a period of 2 to 3 minutes. During the addition, the oil was homogeneously processed into the solution by moving the mixer up and down. After addition of oil was completed, the mixing was continued and the vinegar was added over a period of 1 minute. Again, the vinegar was homogeneously processed into the emulsion by moving the mixer up and down. After mixing the mayonnaise was transferred into 50 cm³ jars, while avoiding as much as possible the entrapment of air and these were then stored at 4° C. for at least 24 h before starting further analysis.

The resultant emulsion had a median oil droplet size of 4.0 µm and a viscosity of 79,000 cP.

The resultant emulsion was heat stable.

TABLE 2

| Ingredient | Dosage (g) | Concentration in final recipe (%) |
|---|---|---|
| RPI90 | 15.0 | 2.9 |
| Water | 107.0 | 21 |

TABLE 2-continued

| Ingredient | Dosage (g) | Concentration in final recipe (%) |
|---|---|---|
| Sodium chloride | 2.0 | 0.4 |
| Sunflower oil | 375 | 74 |
| White vinegar | 10 | 2 |

Example 3

Emulsion Preparation with RPI and Egg Yolk Powder

Example 2 was repeated but with 50% egg yolk powder (EYP HS available from Sanovo) and 50% RPI according to the invention (Example 1, RPI90 available from DSM, native rapeseed protein isolate comprising 40 to 65 wt. % cruciferins and 35 to 60 wt. % napins and having a solubility of at least 88% over a pH range from 3 to 10 at a temperature of 23±2° C. and a conductivity in a 2 wt. % solution of less than 4,000 µS/cm over a pH range of 2.5 to 11.5) using the quantities described in Table 3 below.

The resultant emulsion had a median oil droplet size of 5.5 µm and a viscosity of 81,200 cP. It would be expected, based on the results in Example 2 and Comparative Example 1 (below), that the average viscosity would be 67,000 cP (i.e. [79,000+55,700]/2). There is however a more than 15% increase in measured viscosity, therefore demonstrating a synergistic effect.

The resultant emulsion was heat stable.

TABLE 3

| Ingredient | Dosage (g) | Concentration in emulsion (%) |
|---|---|---|
| Egg yolk powder HS Sanovo | 7.5 | 1.5 |
| RPI90 | 7.5 | 1.5 |
| Water | 107.0 | 21 |
| Sodium chloride | 2.0 | 0.4 |
| Sunflower oil | 375 | 74 |
| White vinegar | 10 | 2 |

Comparative Example 1

Emulsion Preparation with Egg Yolk Powder

Example 2 was repeated but with heat stable (enzymatically treated) egg yolk powder (EYP HS available from Sanovo) instead of rapeseed protein isolate RPI90 using the quantities described in Table 4 below.

The resultant emulsion had a median oil droplet size of 6.7 µm and a viscosity of 55,700 cP.

The resultant emulsion was heat stable.

TABLE 4

| Ingredient | Dosage (g) | Concentration in emulsion (%) |
|---|---|---|
| Egg yolk powder HS Sanovo | 15.0 | 2.9 |
| Water | 107.0 | 21 |
| Sodium chloride | 2.0 | 0.4 |
| Sunflower oil | 375 | 74 |
| White vinegar | 10 | 2 |

Comparative Example 2

Emulsion Preparation with Low Soluble RPI

Example 2 was repeated but with a low soluble (classic) RPI with a solubility less than 90% across a pH range of 3 to 8 and less than 70% across a pH range of 4 to 6 using the quantities described in Table 5 below.

The resultant emulsion had a median oil droplet size of 39 µm and a viscosity of 30,900 cP.

TABLE 5

| Ingredient | Dosage (g) | Concentration in emulsion (%) |
|---|---|---|
| Classic RPI | 15.0 | 2.9 |
| Water | 107.0 | 21 |
| Sodium chloride | 2.0 | 0.4 |
| Sunflower oil | 375 | 74 |
| White vinegar | 10 | 2 |

The invention claimed is:

1. An emulsion comprising:
   i) 15 to 75 wt. % of water;
   ii) 5 to 80 wt. % of vegetable oil;
   iii) 1.5 to 5 wt. % of an emulsifying agent comprising at least 20 wt. % of native rapeseed protein isolate comprising 40 to 65 wt. % cruciferins and 35 to 60 wt. % napins and having a solubility in water of at least 88% over a pH range from 3 to 10 at a temperature of 23±2° C.;
   iv) up to 15 wt. % of additives;
   wherein i)+ii)+iii)+iv) add up to 100 wt. % or less, wherein the emulsion has an oil droplet size in the range of from 2 to 10 µm.

2. An emulsion according to claim 1 wherein in iii), the emulsifying agent comprises rapeseed protein isolate and egg yolk protein in a ratio in the range of from 40:60 to 60:40.

3. An emulsion according to claim 1 with a viscosity of from 50,000 cP to 100,000 cP.

4. An emulsion according to claim 1 that is heat stable at 110° C. for at least 10 minutes.

5. An emulsion according to claim 1 wherein the native rapeseed protein isolate has a solubility of at least 94% at a pH in the range of from 3 to 10 at a temperature of 23±2° C.

6. An emulsion according to claim 1 wherein the native rapeseed protein isolate in a 2 wt. % aqueous solution has a conductivity of less than 9,000 pS/cm over a pH range of 2 to 12.

7. An emulsion according to claim 1 wherein the native rapeseed protein isolate has a phytate level of less than 0.4 wt. %.

8. An emulsion according to claim 1 wherein the native rapeseed protein isolate has a protein content of at least 90 wt. % (N×6.25) on a dry weight basis.

9. A method for obtaining an emulsion having an oil droplet size in the range of from 2 to 10µm comprising
   i) 15 to 75 wt. % of water;
   ii) 5 to 80 wt. % of vegetable oil;
   iii) 1.5 to 5 wt. % of an emulsifying agent comprising at least 20 wt. % of native rapeseed protein isolate comprising 40 to 65 wt. % cruciferins and 35 to 60 wt. % napins and having a solubility in water of at least 88% over a pH range from 3 to 10 at a temperature of 23±2° C.;

iv) up to 15 wt. % of additives;
wherein i)+ii)+iii)+iv) add up to 100 wt. % or less.
   comprising:
A) mixing ingredients (i) and (iii) to solubilize (iii);
B) adding (ii) while stirring;
C) adding (iv) while stirring.

10. A food product or a pet food product comprising the emulsion according to claim 1.

11. The food product according to claim 10 selected from the group consisting of mayonnaise, dressings, and mayonnaise-type spreads.

12. The pet food product according to claim 10 which comprises from 5% to 35 wt. % of native rapeseed protein isolate.

\* \* \* \* \*